United States Patent [19]
Warren

[11] 3,805,943
[45] Apr. 23, 1974

[54] SWIVEL-LIFT VACUUM ARTICLE LOADER

[76] Inventor: William H. Warren, E. Brookfield Rd., North Brookfield, Mass.

[22] Filed: Mar. 24, 1971

[21] Appl. No.: 58,714

[52] U.S. Cl. ............. 198/20 R, 214/1 BV, 214/309
[51] Int. Cl. ...................... B65b 21/02, B65g 47/04
[58] Field of Search............ 198/20 R, 34; 53/247; 214/1 BV, 309

[56] References Cited
UNITED STATES PATENTS

| 3,272,360 | 9/1966 | Schoot | 214/1 BV X |
| 3,360,102 | 12/1967 | Cummings | 198/34 X |
| 3,415,388 | 12/1968 | Hornlein | 214/1 BV X |
| 3,542,224 | 11/1970 | Warren | 198/34 X |

Primary Examiner—Edward A. Sroka
Attorney, Agent, or Firm—Charles R. Fay

[57] ABSTRACT

A machine receiving and lifting articles advancing in a plurality of rows, by a plurality of separate plates, each of which lifts several of the articles, swivels the plates through an arc to a point of deposit while at the same time spreading the plates to spread the articles in rows over a wider area at the point of deposit, and means for releasing the articles at the point of deposit.

8 Claims, 10 Drawing Figures

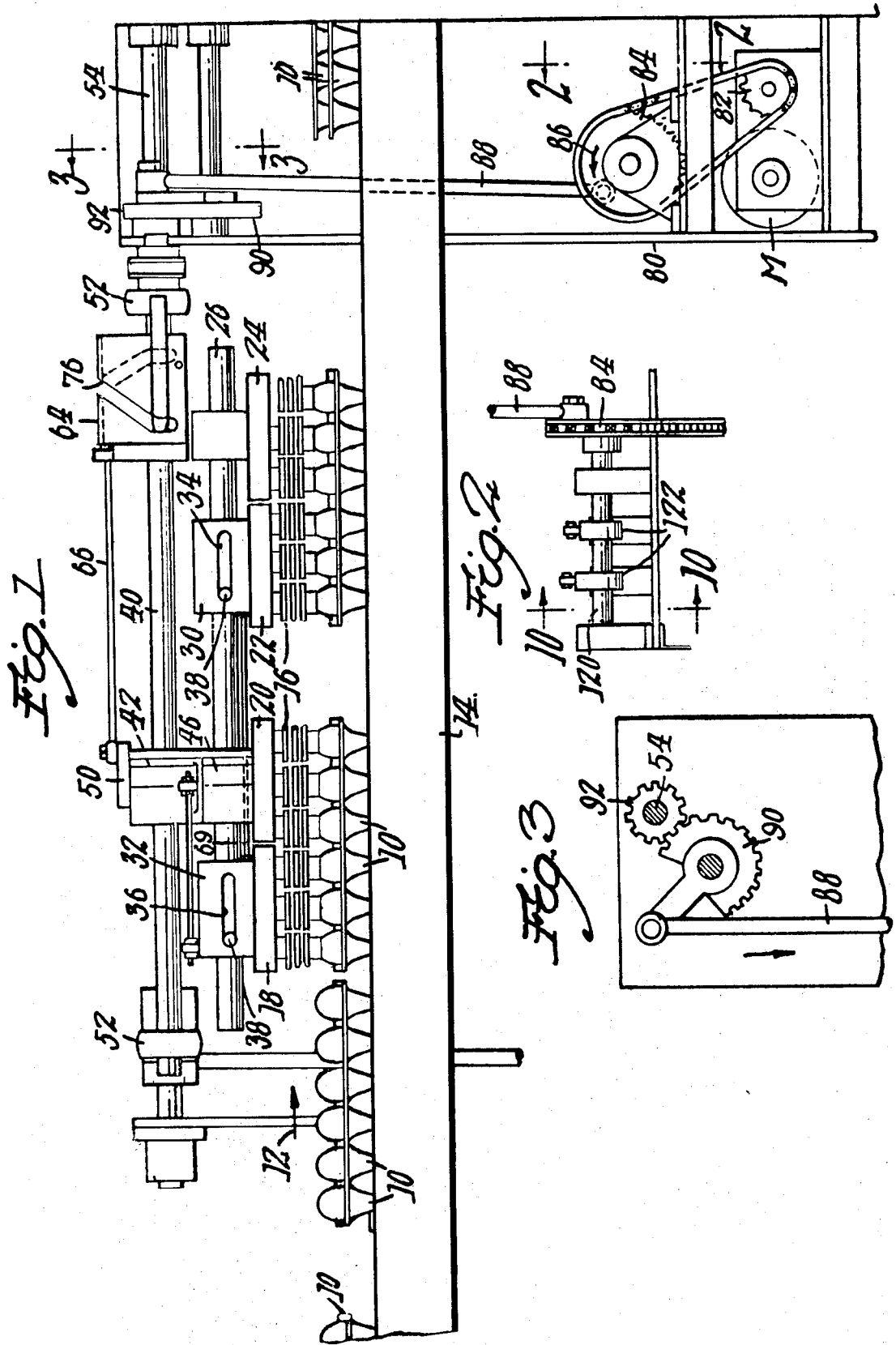

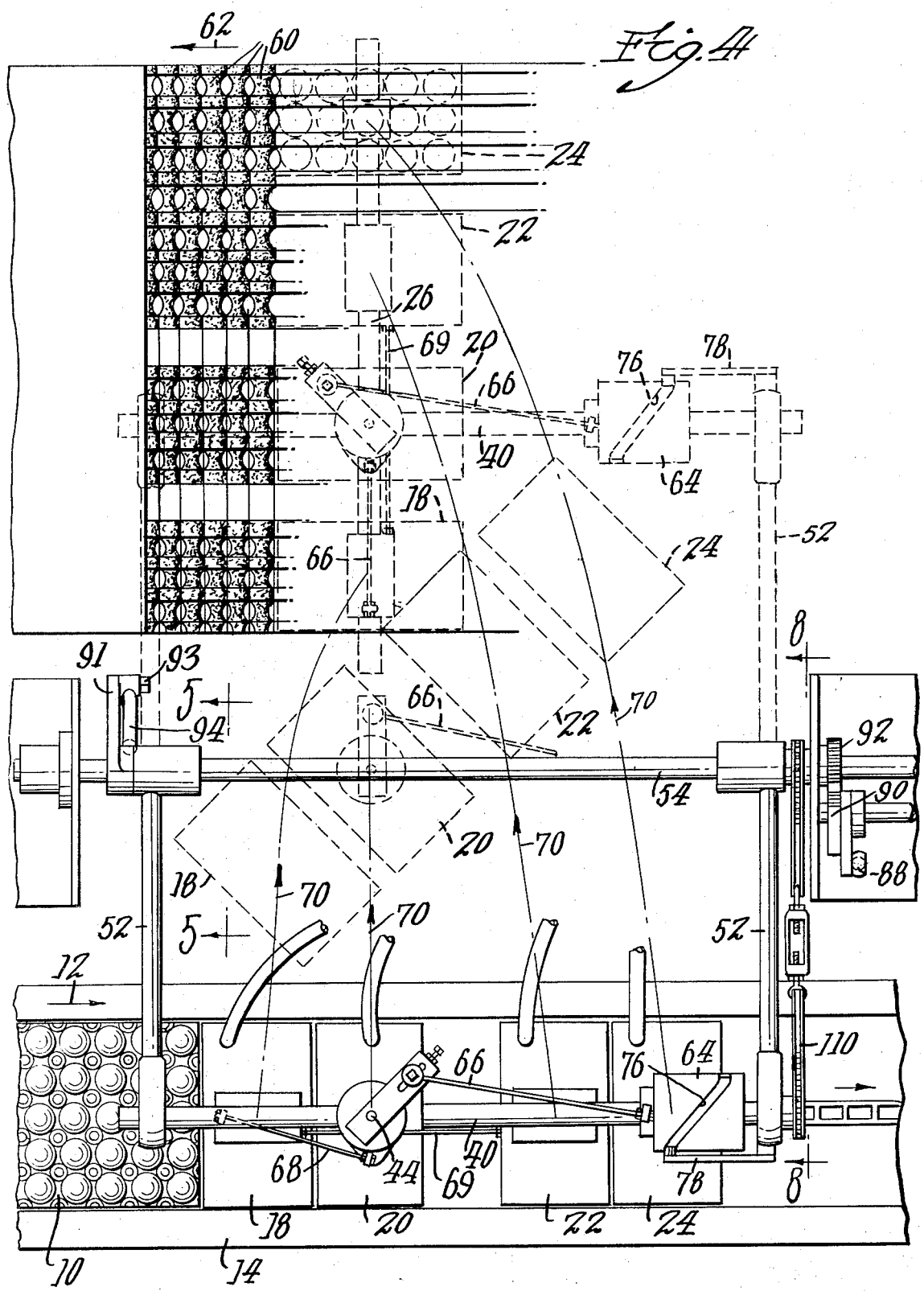

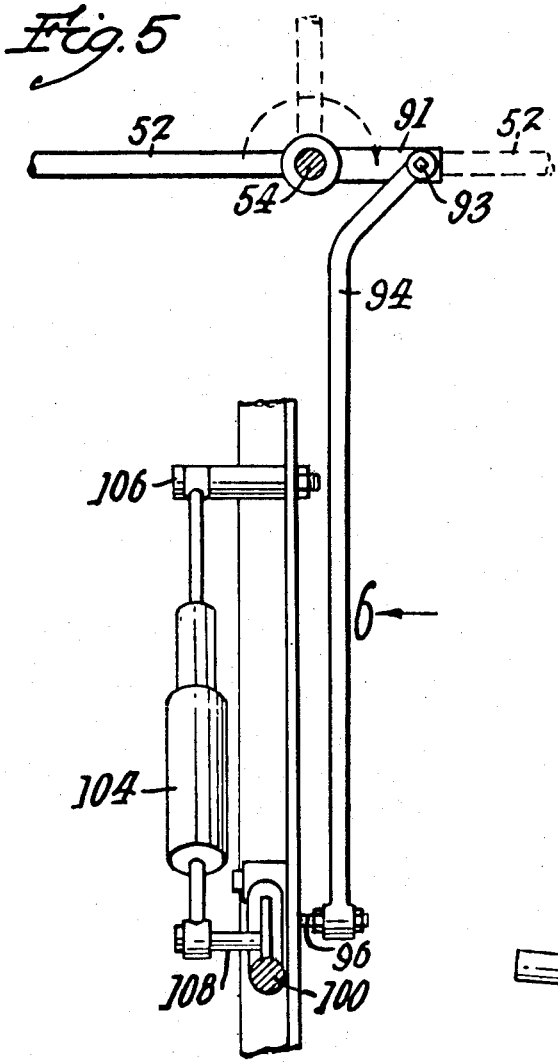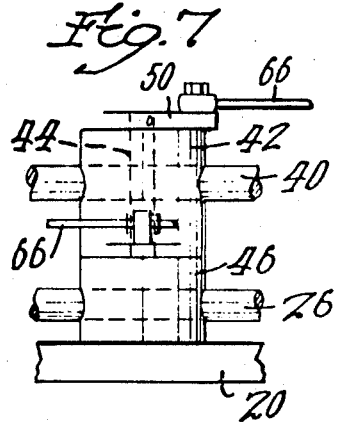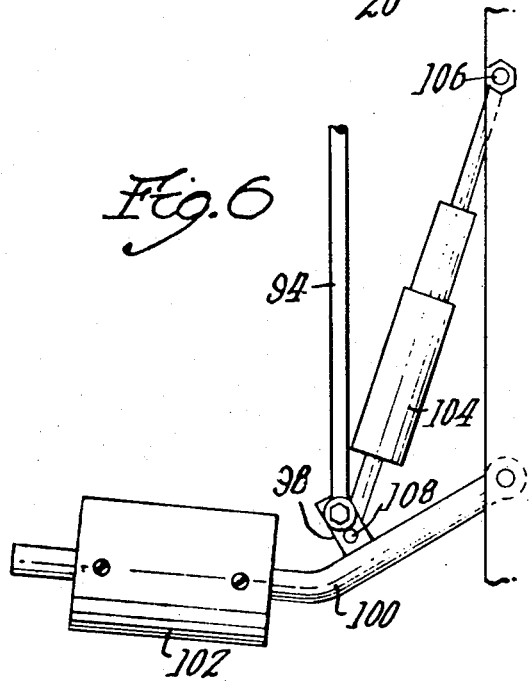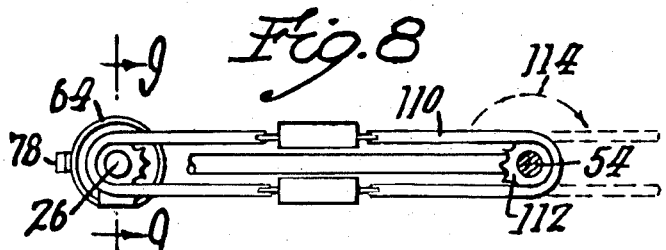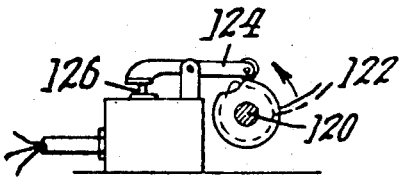

SWIVEL-LIFT VACUUM ARTICLE LOADER

BACKGROUND OF THE INVENTION

It is well recognized that an expensive time and labor consuming action in the transfer of a great many articles being processed resides in the necessity of using manual labor in transferring the articles for instance from one conveyor to another conveyor, say for instance at a different level, at a different spacing of the articles, or for an ensuing operation; or even in merely transferring the articles from one line of advance to a different line of advance, often along a different line of direction.

In particular where eggs are concerned, the eggs not only have to be transferred from one machine to another, e.g., from a machine accepting the eggs from the usual trays, to a machine to be washed, graded, etc., but of course the eggs being fragile, they must be handled very carefully. There is a long line of prior art relative to elastomeric vacuum chucks for eggs, and such chucks can be used in the present invention also. In the prior art it is also proposed to use automatic belt line egg collections, faster operations, faster washing, etc. Where automatic belt lines are used to convey the eggs from the cages directly to the egg washer, the belt lines feed directly into the same location as has been generally used for the loader, making it therefore in many cases impossible to easily locate the loader, and it is still desirable in some plants to have a loader to automatically load eggs from other sources onto their particular washing and grading machines.

SUMMARY OF THE INVENTION

Reference is made to my copending patent application Ser. No. 811,684 filed Mar. 3, 1969, "Dual Differential Stacking;" Ser. No. 803,709 filed Mar. 3, 1969, "Transferring Horizontal Batches of Articles to a Different Level;" and also to issued U.S. Pat. No. 3,437,096 Apr. 8, 1969, "Egg Transferring Device."

Specifically in the present case, mechanism is provided for the provision of a side loader incorporating some of the attributes of the prior art as represented by the applications and patent cited, but also having a specially designed lifter head system to accommodate the new specifications as laid down by the use of the automatic belt egg line collection and other advances in the art. To this end there is herein provided a lifter plate structure for the pickup and deposit of the eggs as described, see above, together with a swivel mechanism turning the plates during their lifter motion and also at the same time incorporating an automatic mechanism to positively open and close the lifter plates as required.

Opening and closing the lifter plates causes any articles on such lifter plates to be moved in series away from each other in batches, and this is required as described in my copending patent applications because the eggs are provided in trays and are therefore aligned in a certain predetermined relationship, reference here being made to the ordinary commercial egg trays, but for the washer and grader machines the grouping is necessarily different and so is the type of conveyor used, the eggs being deposited upon spools provided with depressions therein to hold the eggs and carry them forward to the next operation, i.e., washing, grading, etc.

At the same time use is made of as simple a mechanism as possible which will operate continuously without trouble and with little liability of dropping and breaking the eggs. Means is provided to keep the lifter plates and therefore the eggs in the same plane throughout 180° of travel from one conveyor to another, with specific details of the swivel mechanism providing an adjustable apparatus for opening and closing the lifter plates as may be required by any particular installation.

In addition to the above, a novel counterweight suspension system including a modified connecting arm producing an increasingly disproportionate amount of counterweight available compensating for varying moments due to the lifter and the extra weight imposed by other parts of the machine, including an eccentric swivel construction as will be described more particularly hereinafter.

BRIEF DESCRIPTION OF THE DRAWINGS

FIG. 1 is a view in elevation illustrating the machine in general;

FIG. 2 is a view in elevation, partly in section, on line 2—2, of FIG. 1;

FIG. 3 is a section on line 3—3 of FIG. 1;

FIG. 4 is a plan view of the mechanism shown in FIG. 1;

FIG. 5 is a section on line 5—5 of FIG. 4;

FIG. 6 is a view in elevation looking in the direction of arrow 6 in FIG. 5;

FIG. 7 is an enlarged view in elevation of the swivel block;

FIG. 8 is a section on line 8—8 of FIG. 4;

FIG. 9 is a section on line 9—9 of FIG. 8; and

FIG. 10 is a section on line 10—10 of FIG. 2.

PREFERRED EMBODIMENT OF THE INVENTION

In general, egg trays 10 of conventional design move to the right in the direction of arrows 12 on a framework 14 as shown in FIGS. 1 and 4. As they advance to the proper position they are picked up under vacuum by elastomeric egg chucks 16 arranged in series of rows on lifting plates 18, 20, 22 and 24. It will be understood from the prior art what the construction and operation of these elastomeric egg chucks is but in any event they are arranged so as to pick up all of the eggs within a certain area. For instance, if there are five lines of six eggs each in a single tray, as seen by comparing FIGS. 1 and 4, there are three lines of five egg chucks each on each plate 18, 20, 22 and 24, and it will be seen that two plates 18 and 20 pick up all the eggs from a single tray 10, and the same is true as to the two plates 22 and 24.

The egg plates 18, 20, 22 and 24 are suspended from a rod 26. Plates 20 and 24 are stationary on the rod insofar as longitudinal motion therealong is concerned, but plates 18 and 22 are axially movable along the rod 26 relatively speaking toward the left in FIG. 1, being mounted on brackets 30 and 32 having slots 34, 36 in which are engaged pins 38 on the rod 26.

As shown, the egg plates 18, 20, 22 and 24 are "closed," but when plates 18 and 24 move towards the left with respect to plates 20 and 24, the plates are said to "open," and this of course rearranges the spacing of the eggs in batches.

The rod 26 is mounted on another rod 40 by means of a relatively large block 42 which has a vertical swivel pin 44 or the like in it, see FIG. 7, and the swivel pin 44 is fixed to a swivel block 46 which in turn mounts the rod 26. The pin 44 is provided with a crank or the like 50 so that if crank 50 is turned relatively speaking, the block 42 being mounted on rod 40 of course does not turn, but the swivel block 46 does turn.

The rod 40 is mounted on a pair of lifter arms 52, 52 in turn mounted on a shaft 54, see FIG. 4. Means is provided to be later described for pivoting the arms 52 up from the FIG. 1 position and as shown in solid lines in FIG. 4, to the dotted line position in FIG. 4 to move the eggs from the conveyor 14 to a spool or roller conveyor 60, FIG. 4, which carries the eggs off in the direction of arrow 62.

A barrel cam 64 is provided which is moved at the same time as the lifter arms 52, 52 from the solid line position of FIG. 4, being translated to the left to the dotted line position therein, and this causes an arm 66 to act on crank 50 to turn block 46 so that the shaft 26 is turned 90° from the position of FIG. 1 and the solid line position of FIG. 4 to the dotted line position thereof in FIG. 4. Simultaneously rod 69 which connects blocks 18 and 22, causes the opening of plates 18 and 22 from the closed position in FIG. 1 and in solid lines in FIG. 4 to the dotted line position in FIG. 4, this action being shown by the line or arrows 70, FIG. 4.

Vacuum means is provided for the egg chucks to pick the eggs up in the FIG. 1 position, and this vacuum is not only released but pressure dislodges the eggs from the chucks in the dotted line position of the eggs in FIG. 4, so that they are positively ejected but at the same time are in position to fall on the spools or rollers 60 without breaking because they are in close proximity with respect thereto.

It is to be noted that in FIG. 4 there is a diagrammatic representation of the half-way point of the plates 18, 20, 22 and 24 in order to make the actuation of the various parts so far described clearer, and it is to be noted that cam 64 is a barrel cam having an appropriate track 76 for a follower on an arm 78 on the arm 52, see particularly FIG. 1, this cam 64 being e.g., mounted on the rod 40 and moving with and along it.

GEARING FOR THE ABOVE

The conveyor frame 14 is elevated and this provides for a framework at 80, FIG. 1, containing a motor M, a gear reducer, etc., the same driving gear 82 and in turn driving another gear double the size at 84. This gear rotates in the direction of the arrow 86 and in effect is a crank operating the rod 88, see FIG. 3, rod 88 oscillating a mutilated gear 90 in turn oscillating a smaller gear 92 fixed to shaft 54, and oscillating it to in turn oscillate rod 40 the 180° described, as by the lifter arms 52, 52.

A new and improved counterbalance system is provided, this being shown in FIGS. 5 and 6. The shaft 54 is provided with a short arm 91 to which is pivoted at 93 a long arm 94. The oscillation of shaft 54 as above described oscillates arm 91 through 180° and therefore moves arm 94 up and down.

The lower end of arm 94 which is laterally adjustable as on a screw 96 to suit different conditions is pivoted with respect to a bracket 98 on an arm 100 having outboard of arm 94 an adjustable weight 102 which acts as a counterbalance with respect to the lifter arms, etc., in the motion from a horizontal plane upwardly to a vertical and down again to the terminal horizontal plane at 180° thereto. In addition there is also provided a dashpot arrangement generally indicated at 104 between pivot points 106 and 108 as clearly shown in FIGS. 5 and 6. The importance of this will be clearly seen and it is easily adjusted to conform to the machine being loaded and to provide an increasingly disproportionate amount of counterweight available, compensating for the extra weight imposed by the eccentric swivel.

Plates 18, 20, 22 and 24 are maintained positively horizontal at all times by means of a chain 110, see FIG. 4, which is geared at 112 to the shaft 54. This chain 110 therefore moves relatively to shaft 54 in its 180° motion, see the arrow 114 in FIG. 8, so as to correspondingly turn shaft 26.

The gear 84, see FIG. 1, is mounted on a shaft 120 which appropriately turns switches on and off for vacuum compression in a predetermined arrangement as will be clear because the vacuum must be present in FIG. 1 and in the solid line position of FIG. 4, and the pressure must occur at exactly the correct moment in the dotted line position of the lifter plates 18, 20, 22 and 24 in FIG. 4.

In FIG. 10 there are shown cams as at 122 rotated by the shaft 120 and acting on a pivoted arm 124 to actaute switch 126 in a predetermined manner in order to achieve the alternate vacuum and pressure for the lifter plates as required.

I claim:

1. An article transfer apparatus wherein articles proceed on a first conveyor to a first position at a predetermined point, and are then lifted from said first conveyor and transferred to a second position at a predetermined point on a second conveyor, the articles being spaced in a predetermined manner on the first conveyor and in a different manner on the second conveyor, the latter being at an angle to the first conveyor, comprising an article lifter rod, means to transfer the rod and articles along a predetermined path from the first position to the second position over the second conveyor, means on said rod for securing articles thereto at the first position, and means causing ejection of said articles at the second position, there being a plurality of aligned means on the article lifter rod securing articles thereto arranged in a row, and means on the lifter transfer means changing the relative angular position of said article lifter rod to change the orientation of the row of articles thereon at the second position, to conform to the second conveyor, a plurality of plates on the rod, there being a plurality of said article securing means on each plate, means supporting the plates in a predetermined arrangement with respect to each other, and means on the lifter changing the relative positions of said plates.

2. The article transfer apparatus of claim 1 wherein the change of orientation at the second position being approximately 90°.

3. The article transfer apparatus of claim 1 including means spacing certain article securing means on said lifter at a different spacing at the second position from the spacing thereof at the first position.

4. The article transfer means of claim 1 said last-named means causes said plates to move away from each other during the motion of the lifter rod from the first position to the second position and to return to originally closely spaced position upon return motion thereof to the first position.

5. The article transfer apparatus of claim 4 including means maintaining said plates in horizontal position during the lifter rod motion.

6. The article transfer apparatus of claim 1 wherein the transfer means includes at least one arm movable in an arc about a center and the lifter rod includes plates moving therewith, means for maintaining said plates horizontal throughout the entire motion thereof, and a counterbalance for the lifter.

7. The article transfer apparatus of claim 1 wherein the transfer means includes an arm movable in an arc about an axis, the article lifter rod being mounted on the arm eccentric to the axis, a counterbalance for the arm and article lifter rod, and means providing an increasing and decreasing amount of effective counterweight compensating for the moments of the eccentricity of the lifter rod.

8. The article transfer apparatus of claim 7 including a central shaft for the arm, the counterbalance being associated therewith and including an eccentric link on the shaft, the counterweight being connected to the link.

* * * * *